July 21, 1964  J. C. W. BEADLE ETAL  3,141,641
LOAD-EXTRACTION FROM AIRCRAFT
Filed Oct. 23, 1962
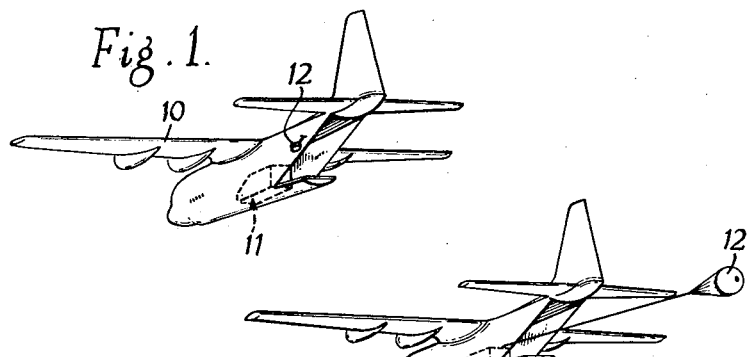
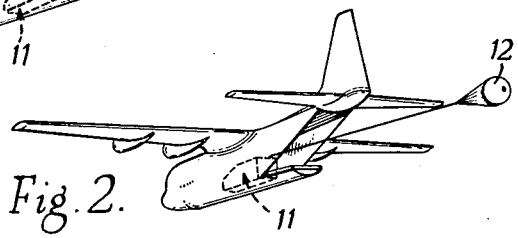
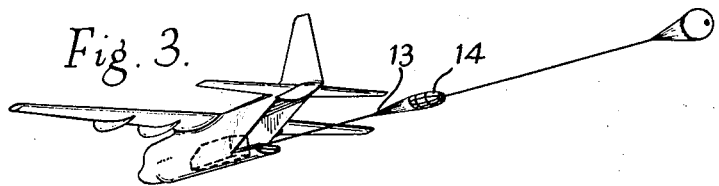
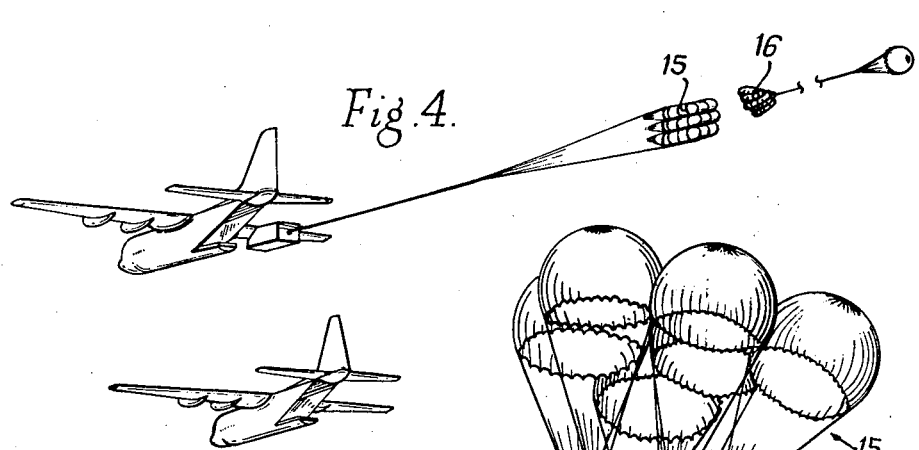
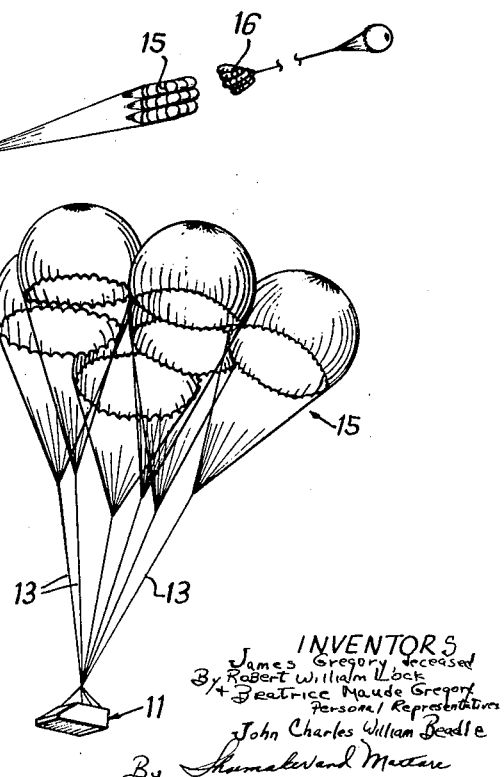

United States Patent Office 3,141,641
Patented July 21, 1964

3,141,641
LOAD-EXTRACTION FROM AIRCRAFT
John Charles William Beadle, Woking, England, and James Gregory, deceased, late of Woking, England, by Robert W. Lock and Beatrice M. Gregory, representatives, both of Woking, England, assignors to G. Q. Parachute Company Limited, Woking, England, a British company
Filed Oct. 23, 1962, Ser. No. 233,196
Claims priority, application Great Britain Oct. 25, 1961
2 Claims. (Cl. 244—138)

This invention relates to a system of and apparatus for load-extraction and load-delivery from an airborne aircraft to ground level.

The term "main canopy assembly" as used throughout the following description and in the appended claims is intended to refer to a single main canopy or to a cluster of two or more main canopies.

One system in use at the present time for effecting delivery by parachute of loads from an aircraft, employs a first parachute known as the extractor/retarder parachute, the function of which is, when deployed and fully inflated, to extract the load from the aircraft, and thereafter to retard the descent under gravity of that load until such time as the main canopy assembly has been deployed by the drag exerted on the pack or packs containing said assembly, support of the load being eventually taken over by the inflated main canopy assembly.

The disadvantages inherent in this system are:

(1) That the load, after it has been pulled off the sill of the aircraft, is virtually allowed to fall freely, there being very little drag exerted on said load by the extractor/retarder parachute. Therefore, in the time interval between the instant at which the load is no longer supported by the aircraft's sill and full or substantially full inflation of the main canopy assembly, the load is able to gather quite considerable momentum.

(2) Once the load has gathered considerable momentum, inflation of the main canopy assembly may result in damage or destruction of the canopy or canopies forming the assembly. It has been known, when dropping heavy loads, for one of a cluster of main canopies to develop and inflate fully before the others in the group of canopies with the result that this single inflated canopy is subjected to a violent shock loading which either bursts the canopy itself, ruptures the cable or, in one extreme case, actually broke the disconnect.

(3) The heavier the loads being dropped, the more severe will be the shock loadings referred to above and the greater will be the momentum of the load by the time any of the main canopies become fully inflated.

(4) The unavoidable delay between extraction of the load from the aircraft and full inflation of the main canopy assembly limits the minimum height from which loads weighing more than about 28,000 lbs. may be dropped to 2,500 feet, although it is difficult to make an arbitrary demarcation line as regards weight in this context. If it is required to drop loads weighing significantly more than 28,000 lbs. the strength of the various components will have to be increased, and increasing the strength of any one component means proportionately increasing the strength of the others in turn, thus beginning a vicious circle which would probably yield no worthwhile increase in the loads which could be dropped with achievement of a good landing with all parachutes fully developed and remaining attached until the touch-down.

The principal object of the present invention is to extract and deliver a load but primarily a medium to heavy load from an airborne aircraft to ground level employing only the main canopy assembly.

The present invention will now be more particularly described with reference to the accompanying drawings which illustrate diagrammatically the new principle being carried into effect.

In the drawings, an airborne aircraft 10 (FIGURE 1) is transporting a load 11 to which there is attached a roll pack extractor parachute 12, said parachute being suspended for deployment by the well-known pendulum release system. The alternative sill-bracket release system could also have been employed.

FIGURE 2 illustrates the extractor parachaute 12 deployed and inflated. The load 11 is still stationary.

FIGURE 3 illustrates the extractor parachute 12 deploying the suspension cables 13 and the packed main canopy assembly 14 in sequence.

FIGURE 4 illustrates the inflated but reefed main canopy assembly 15 which has extracted the load 11 from the aircraft, the extractor parachute 12 being allowed to float to earth with the pack 16 of the main canopy assembly.

FIGURE 5 illustrates the de-reefed main canopy assembly 15, consisting of a cluster of six canopies, fully inflated and supporting the load 11.

It will be appreciated that the present invention lies in the omission of a canopy and, therefore, of its function. This apparently simple but far from obvious step has, however, yielded some unexpected and very important (from the military standpoint) advantages, namely:

(1) It is now possible to drop troops and their ancillary large equipment (lorries, guns, etc.) at the same height.

(2) With the reefed main canopy assembly system a controlling force on the load platform is maintained throughout the deployment stages and the induced shock loadings are now considerably less violent. So improved, in fact, is the whole performance that parachute cable breakage and serious canopy damage have been eliminated completely or substantially completely. This has, therefore, meant that it is possible to drop loads of great weight without the velocity of the load becoming too great, with the original number of canopies of the assembly remaining attached to the load until touch-down and from a dropping height which is only 40% of the previous imposed minimum dropping height.

The degree of success achieved with the use of the system according to the present invention will be now illustrated by reference to some of the many trials which have been conducted. The speed at which each of the loads was dropped was 115 knots. The canpoy employed to form each cluster was a shaped canopy of 66 feet diameter. The time delay before de-reefing the reefed main canopy assembly was 4.3 seconds and the total length of the reefing cords used was 40 feet.

| Store Weight (lbs.) | Dropping Height (feet) | Number of Canopies in Cluster | Time in seconds from release of extractor until— | | | |
|---|---|---|---|---|---|---|
| | | | A | B | C | D |
| 13,600 plus parachutes | 1,500 | 3 | 4.5 | 6.6 | 11.3 | 50 |
| 19,500 plus parachutes | 1,200 | 5 | 3.5 | 4.7 | 8.7 | 33 |
| 25,800 A.U.W | 1,500 | 6 | 5.9 | 6.9 | 9.8 | 51 |
| 30,100 A.U.W | 1,200 | 7 | 6 | 7.1 | 9.8 | 35.2 |
| 34,400 A.U.W | 1,000 | 8 | 6 | 7 | 9.8 | 29 |
| 35,000 A.U.W | 1,000 | 8 | 6 | 8.9 | not available | 20.2 |

NOTE.—A.U.W.=all up weight, that is the weight of the actual cargo, the weight of the platform and the weight of the parachutes.
All times were taken from observation of the films made of each drop
A = Main canopies fully streamed.
B = Platform off sill.
C = Canopies de-reef.
D = Touch-down.

The six trials set out above are believed to be representative of the series and have not been carefully selected solely because they give spectacularly successful results as will be seen from the analyses below.

Referring to the first trial, it was noted that, after de-reefing, one canopy inflated quickly and the other two inflated at a slower rate. However, all canopies were fully inflated when the platform was 600–700 feet above ground level.

In the second trial, three canopies rapidly reached full inflation after de-reefing, followed closely by the remaining two. Full inflation of the whole canopy assembly occurred at about 200 feet above ground level.

In the third trial, initial deployment appeared to be rather ragged due, it is thought, to two canopies having become entangled with one another. This cleared itself upon inflation to the reefed condition and, after de-reefing, only 5 seconds elapsed between full inflation of the first and last canopies.

In the fourth trial, inflation to the reefed condition was slow, apparently due to entangled rigging lines but extraction of load from the aircraft was good. One canopy inflated fully ahead of the others and broke away but the other six canopies inflated fully almost simultaneously.

In the fifth trial results were poor. There was poor inflation to the reefed condition. Upon de-reefing, one canopy inflated fully too quickly and broke away. Full inflation of remaining seven was quite good but one only became fully inflated just prior to touch-down. The platform landed heavily.

In the sixth trial, four canopies of the original eight had become fully inflated at touch-down and two were only partly inflated. The other two canopies had blown peripheries and one of these later burst and split along the canopy length.

However poor the fifth and sixth trials may appear on paper, it must be remembered that the purpose of trials is to test equipment under service conditions and thereafter modify the equipment to achieve a better result where a poor one was obtained. In fact, these two trials were encouraging and showed that, with improvements made to the equipment, heavy loads (more than 15 tons) can be dropped successfully.

It must be pointed out that the trial results available for the preparation of this specification relate only to a canopy of a particular size reefed with two 20 feet long reefing cords. It is not to be inferred from this that the system according to the invention is limited in any way to equipment of that character. Trials are in progress, now that the merit of the system has been proved employing 66 feet diameter shaped canopies, using 42 feet diameter shaped canopies and 60 feet diameter flat canopies. It seems likely that two reefing cords each 12 feet long will prove to be the optimum length for reefing each 42 feet diameter canopy and that two reefing cords each 15 feet long will give the best results for reefing the 60 feet diameter canopies. This contrasts with the 40 feet total length of reefing cord which we have used on the 66 feet diameter shaped canopies and which, for that size of canopy, gives the best results.

It follows, therefore, that load-extraction and load-delivery to ground level using only the main canopy assembly is not in any way identified with a particular size or form of canopy. Whatever canopy is chosen for the job, either singly or in clusters, it will doubtless be necessary for modifications to be made (which are well within the capabilities of any competent parachute maker to specify) before the desired level of uniformity of results is obtained. For example, in order to obtain the sort of shape of an inflated reefed 66 feet diameter shaped canopy which would ensure quick development to full inflation after de-reefing, we found it desirable to (a) Provide the canopy with a dual porosity crown;

(b) as an alternative to (a), the provision of a crown insert attached to a cross-seam in the crown section and to the vent ring; this alternative reduced manufacturing costs and difficulties of (a);

(c) The canopy was wrapped in a cotton wrap to reduce canopy damage by searing during deployment;

(d) The time-delay before de-reefing was standardised at 4.3 seconds (as distinct from a more normal delay of about 1.5 seconds) since this seemed to yield the best results;

(e) The rigging lines were bridled, namely, the rigging lines were arranged in eight sequenced groups, two groups to each of four segments per canopy. Each group of lines was attached to a webbing bridle strop and a pair of said strops was attached to each of four bridle link fittings on the cruciform connection which is attached to the disconnect. This not only eliminated rigging line entanglement after a drop almost completely but also reduced initial cost of manufacture by permitting the shortening of the rigging lines by about 40 feet;

(f) Taschengursts of increased strength were employed.

It will be obvious to those skilled in this art that reefing need not be achieved mechanically but can also be achieved aerodynamically.

What we claim as our invention and desire to secure by Letters Patent of the United States is:

1. A system for complete load-extraction and load-delivery from an airborne airplane to ground level consisting of the following steps:
    (1) reefing a main canopy assembly to limit the mouth diameter of each component of said assembly for a predetermined period of time after deployment of said assembly;
    (2) deploying said reefed canopy assembly in order to cause inflation of each component thereof;
    (3) completely extracting said load by said canopy assembly from said airplane by means only of said inflated reefed main canopy assembly free of any attachment to said airplane;
    (4) de-reefing said inflated canopy assembly after said pre-determined time delay to achieve full inflation of each component of said canopy assembly; and
    (5) delivering said load through free fall to ground level under complete control of said fully inflated canopy assembly.

2. A system as claimed in claim 1, wherein said predetermined time delay is in excess of 1.5 second.

References Cited in the file of this patent
UNITED STATES PATENTS

| | | |
|---|---|---|
| 2,742,697 | Gross | Apr. 24, 1956 |
| 2,774,560 | Johnson | Dec. 18, 1956 |
| 2,845,240 | Marshall | July 29, 1958 |
| 2,980,371 | Finney | Apr. 18, 1961 |
| 3,096,055 | Cotton | July 2, 1963 |